(12) United States Patent
Chen et al.

(10) Patent No.: US 12,536,645 B2
(45) Date of Patent: Jan. 27, 2026

(54) PHOTOMASK INSPECTION METHOD USING IMAGE INENSITY RATIO

(71) Applicant: UNITED MICROELECTRONICS CORP., Hsin-Chu (TW)

(72) Inventors: Pai-Chi Chen, Pingtung County (TW); Chian-Ting Huang, Tainan (TW); Yung-Feng Cheng, Kaohsiung (TW)

(73) Assignee: UNITED MICROELECTRONICS CORP., Hsin-Chu (TW)

( * ) Notice: Subject to any disclaimer, the term of this patent is extended or adjusted under 35 U.S.C. 154(b) by 347 days.

(21) Appl. No.: 17/878,896

(22) Filed: Aug. 1, 2022

(65) Prior Publication Data

US 2024/0005475 A1    Jan. 4, 2024

(30) Foreign Application Priority Data

Jun. 30, 2022   (TW) .................................. 111124551

(51) Int. Cl.
*G06T 7/00* (2017.01)
*G06T 7/62* (2017.01)
(52) U.S. Cl.
CPC .............. *G06T 7/0006* (2013.01); *G06T 7/62* (2017.01); *G06T 2207/30148* (2013.01)

(58) Field of Classification Search
CPC  G06T 7/0006; G06T 7/62; G06T 2207/30148
See application file for complete search history.

(56) References Cited

U.S. PATENT DOCUMENTS

| 10,839,131 | B2 | 11/2020 | Liu | |
|---|---|---|---|---|
| 2004/0105577 | A1* | 6/2004 | Wu | ........................... G03F 1/84 382/144 |

FOREIGN PATENT DOCUMENTS

| TW | 201802463 A | 1/2018 |
|---|---|---|
| TW | 202117576 A | 5/2021 |

\* cited by examiner

*Primary Examiner* — Hwa Andrew Lee
(74) *Attorney, Agent, or Firm* — Winston Hsu (57) ABSTRACT

The present invention provides a photomask inspection method, including steps of defining an anchor ratio, providing a photomask and measuring the photomask to obtain a measured ratio, wherein the measured ratio is equal to a value of an image intensity extremum divided by an image intensity threshold or is equal to a value of the image intensity threshold divided by the image intensity extremum when the photomask is measured in an image measurement system tool for a specific critical dimension, and if the measured ratio is larger than the anchor ratio, the photomask is regarded as passing the inspection, and if the measured ratio is smaller than the anchor ratio, the photomask is regarded as failing the inspection.

5 Claims, 6 Drawing Sheets

| Photomask sample | 1st | 2nd | 3rd | 4th | 5th | |
|---|---|---|---|---|---|---|
| Anchor intensity threshold | 0.284 | 0.285 | 0.286 | 0.283 | 0.283 | |
| Anchor intensity extremum | 0.3779 | 0.3802 | 0.3816 | 0.3771 | 0.3778 | |
| WP1 intensity extremum | 0.3384 | 0.3336 | 0.3371 | 0.3372 | 0.336 | |
| WP2 intensity extremum | 0.3852 | 0.3853 | 0.3836 | 0.3823 | 0.3819 | |
| WP3 intensity extremum | 0.3435 | 0.341 | 0.3409 | 0.3399 | 0.3364 | |
| | 1st | 2nd | 3rd | 4th | 5th | 3σ |
| Anchor ratio | 1.331 | 1.334 | 1.334 | 1.333 | 1.335 | 0.005 |
| WP1 measured ratio | 1.192 | 1.171 | 1.179 | 1.192 | 1.187 | 0.027 |
| WP2 measured ratio | 1.356 | 1.352 | 1.341 | 1.351 | 1.349 | 0.017 |
| WP3 measured ratio | 1.210 | 1.196 | 1.192 | 1.201 | 1.189 | 0.024 |
| | | | | | 1.189 | 0.023 |

PHOTOMASK INSPECTION METHOD USING IMAGE INENSITY RATIO

BACKGROUND OF THE INVENTION

1. Field of the Invention

The present invention generally relates to a photomask inspection method, and more specifically, to a photomask inspection method using image intensity ratio.

2. Description of the Prior Art

In semiconductor process, photomask is used in photolithography processes to define hollow-out patterns to be formed in photoresists after exposure and development. These patterns will be transferred onto target layers in later etching steps to form required semiconductor patterns, such as various device or circuit patterns. Generally, inspection steps will be performed during the manufacture of photomasks to check if they meet predetermined specifications and requirements. These inspection steps are usually to measure critical dimensions (CDs) of one-dimensional (1D) patterns on the photomask, such as straight patterns like metal lines and trenches. The measured CDs will be used to infer the ADI CDs (after development inspection critical dimensions) that may be obtained in later processes, so as to determine if the semiconductor patterns formed through the photomask may be at risk of defects, such as circuit necking or bridging.

Nevertheless, as the critical dimension (CD) of semiconductor device keeps shrinking and semiconductor patterns become more and more complicate, the correlation between CD of photomask pattern and resulted ADI CD (after development inspection critical dimension) gets lower. The aforementioned inspection approach for the reliability of photomask based on the measurement of 1D pattern is already inadequate. Those of skilled in the art need to improve current inspection approaches or to develop novel photomask inspection method, in order to meet the requirement of industry.

SUMMARY OF THE INVENTION

In the light of the aforementioned shortcomings in current conventional skills of photomask inspection, the present invention hereby provides a novel photomask inspection method, with features of adopting image intensity ratio having higher correlation with ADI CD (after development inspection critical dimension) as a basis for the inspection method.

The purpose of the present invention is to provide a photomask inspection method, including steps of defining an anchor ratio, providing a photomask and measuring the photomask to obtain a measured ratio, wherein the measured ratio is equal to a value of an image intensity extremum divided by an image intensity threshold or is equal to a value of the image intensity threshold divided by the image intensity extremum when the photomask is measured in an image measurement system tool for a specific critical dimension of a measured image, and if the measured ratio is larger than the anchor ratio, the photomask is regarded as passing the inspection, and if the measured ratio is smaller than the anchor ratio, the photomask is regarded as failing the inspection.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the embodiments, and are incorporated in and constitute apart of this specification. The drawings illustrate some of the embodiments and, together with the description, serve to explain their principles. In the drawings.

Relative dimensions and proportions of parts of the drawings have been shown exaggerated or reduced in size, for the sake of clarity and convenience in the drawings. The same reference signs are generally used to refer to corresponding or similar features in modified and different embodiments.

DETAILED DESCRIPTION

Reference will now be made in detail to exemplary embodiments of the invention, which are illustrated in the accompanying drawings in order to understand and implement the present disclosure and to realize the technical effect. It can be understood that the following description has been made only by way of example, but not to limit the present disclosure. Various embodiments of the present disclosure and various features in the embodiments that are not conflicted with each other can be combined and rearranged in various ways. Without departing from the spirit and scope of the present disclosure, modifications, equivalents, or improvements to the present disclosure are understandable to those skilled in the art and are intended to be encompassed within the scope of the present disclosure.

It will be further understood that the terms "includes," "including," "comprises," and/or "comprising," when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
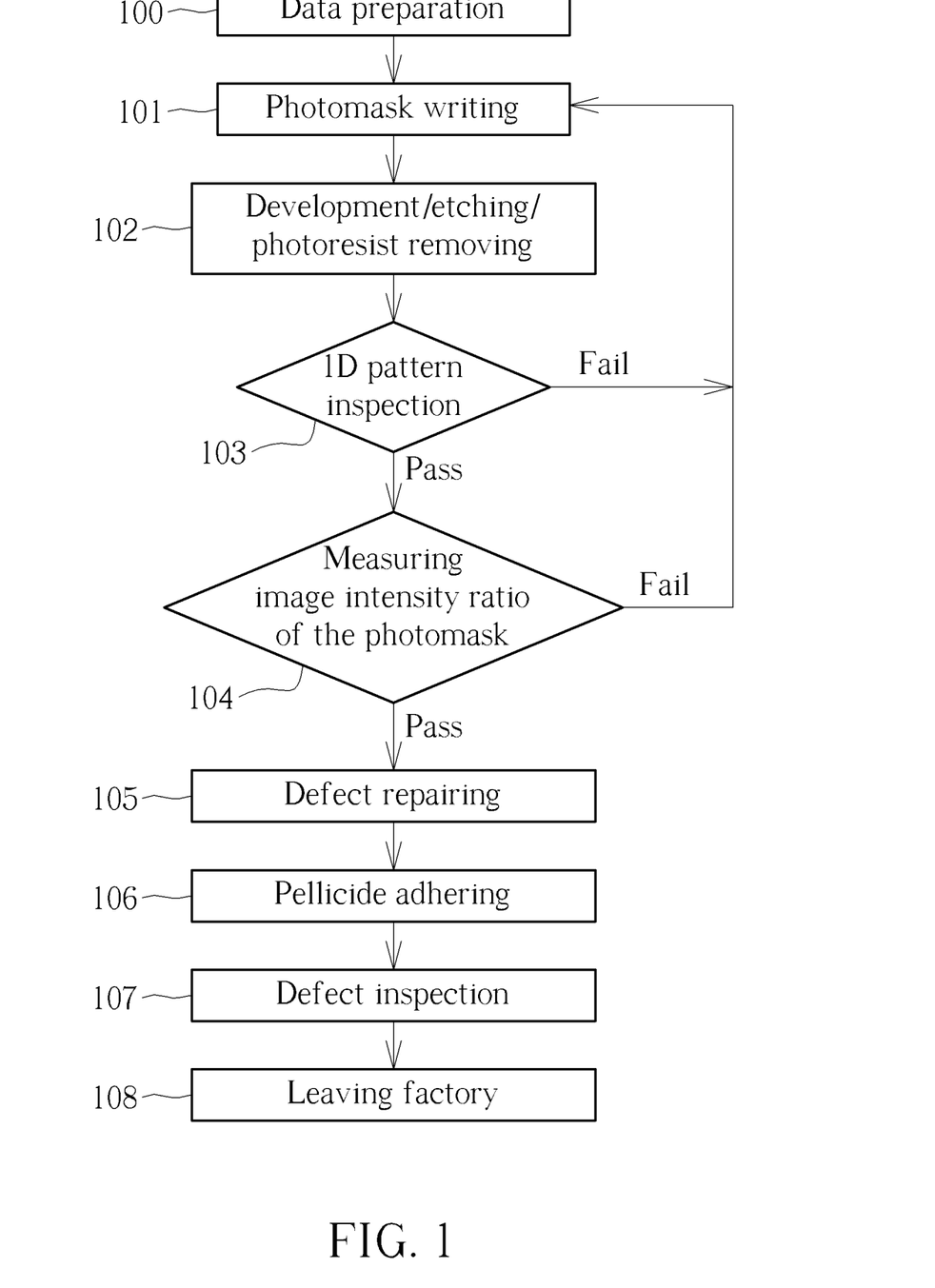
FIG. 1 is a flow diagram of manufacturing a photomask in accordance with the preferred embodiment of the present invention.

Please refer firstly to FIG. 1, which is a flow diagram of manufacturing a photomask in accordance with the preferred embodiment of the present invention, wherein primary steps of manufacturing a photomask from circuit design to inspection and leaving the factory are generally described. First, in step 101 of data preparation, the circuit patterns to be formed on a photomask will be structured in IC design stage, usually by implementing design tools like electronic design automation (EDA) or computer aided design (CAD) through computer equipment in IC design house, wherein steps like specification establishing, function and architecture design and simulation, RTL and logic circuit design and physical layout design may be involved in this stage. Circuit diagram that passes the inspection will be transferred to photomask manufacturer to manufacture physical photomasks.

In step 101 of mask writing, the aforementioned designed circuit pattern will be formed on a photomask substrate, such as high-purity quartz substrate, with layer structures like Cr-based absorption layer and photoresist layer made of photosensitive resin formed thereon, and the designed circuit patterns will be written on the photoresist layer through E-beam or laser beam.

In step 102, the photoresist layer on the photomask substrate is exposed and developed, so as to form the written circuit patterns on the photoresist layer. Thereafter, an etching step is performed using the photoresist layer having the circuit patterns to etch the underlying Cr-based absorption layer, so that the circuit patterns may be transferred onto the Cr-based absorption layer. Lastly, the photoresist layer is removed from the Cr-based absorption layer, so that the required physical circuit patterns are formed on the photomask substrate.

In step 103, the manufactured photomask patterns will be inspected to see if there are defects existing or if required quality or specification is met. In conventional approaches, it is usually to inspect one-dimensional (1D) patterns in the photomask at this stage, for example, straight patterns like conductive lines or trenches in dense region or isolated region. Specifically, critical dimensions (CDs) of these photomask patterns will be measured at this stage and correlation method like linear regression may be used to determine if the ADI CD (after development inspection critical dimension) of photoresist formed through this photomask is at risk of defects, such as circuit necking or bridging. If passing the inspection, follow-up steps may carry on. If failing the inspection, steps are reverted to the stage of photomask writing for tuning, for example tuning the exposure dose.

However, although the aforementioned conventional approach of step 103 may inspect the quality of photomasks, the correlation between CD of photomask pattern and ADI CD of photoresist may get worse as the CD get smaller, and it may also get worse as the complexity of measured patterns itself or surrounding patterns (may be referred as 2D patterns) increases, so that actual quality of the photomask may not be reflected in this inspection step.

In order to solve the problem above, an inspection step 104 for 2D patterns is added after the 1D inspection step 103 in the present invention. Different from the approach of step 103 based on the CD measurement of photomask patterns, the step 104 of present invention measures the image intensity rather than CD of patterns, and the quality of photomask is determined through the correlation between ratio of measured intensities and ADI CD of the patterns. The principle and detail of this inspection step 104 will be described hereinafter in following embodiment.

Figure 2:
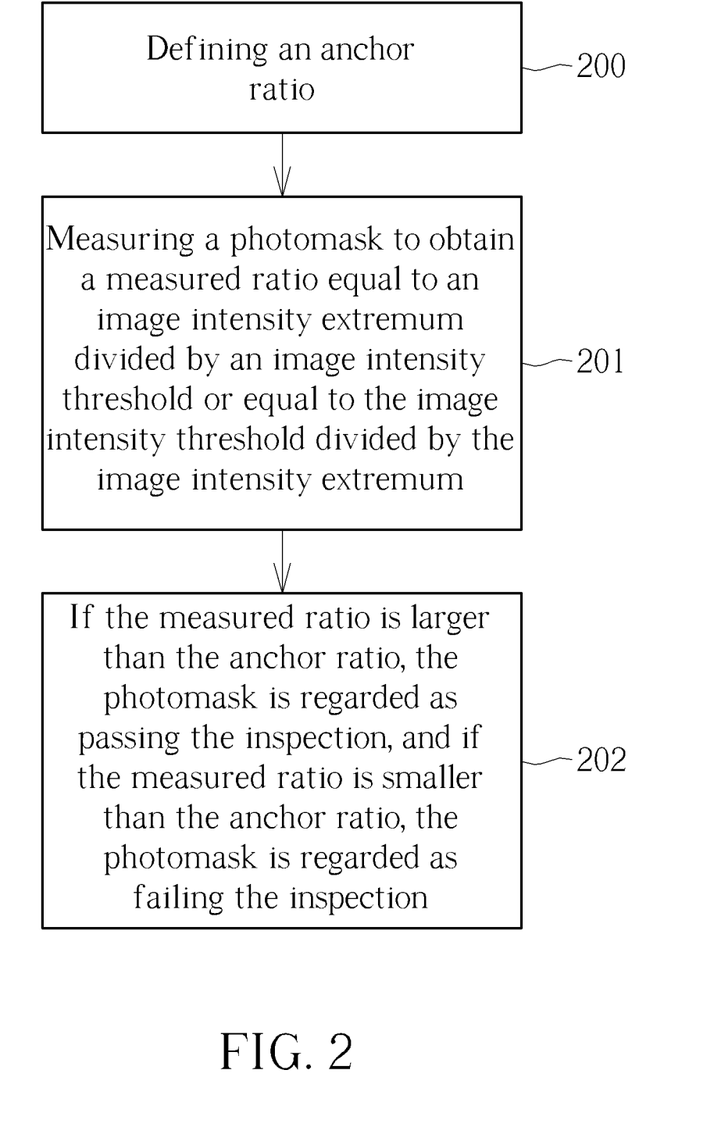
FIG. 2 is a flow diagram of photomask inspection method in accordance with the preferred embodiment of the present invention.

Please refer now to FIG. 2, which is a flow diagram of photomask inspection method in accordance with the preferred embodiment of the present invention, corresponding to the aforementioned step 104 of measuring the intensity ratio of photomask patterns. First, in step 200, an anchor ratio will be defined in advance in the embodiment of present invention. This anchor ratio will be a standard for determining if a measured ratio in actual inspection is beyond the standard or conforms to the specification. In the embodiment of present invention, the anchor ratio may differ depending on the factors like specification of photomask, measured patterns of photomask and measured CDs of patterns.

Figure 3:
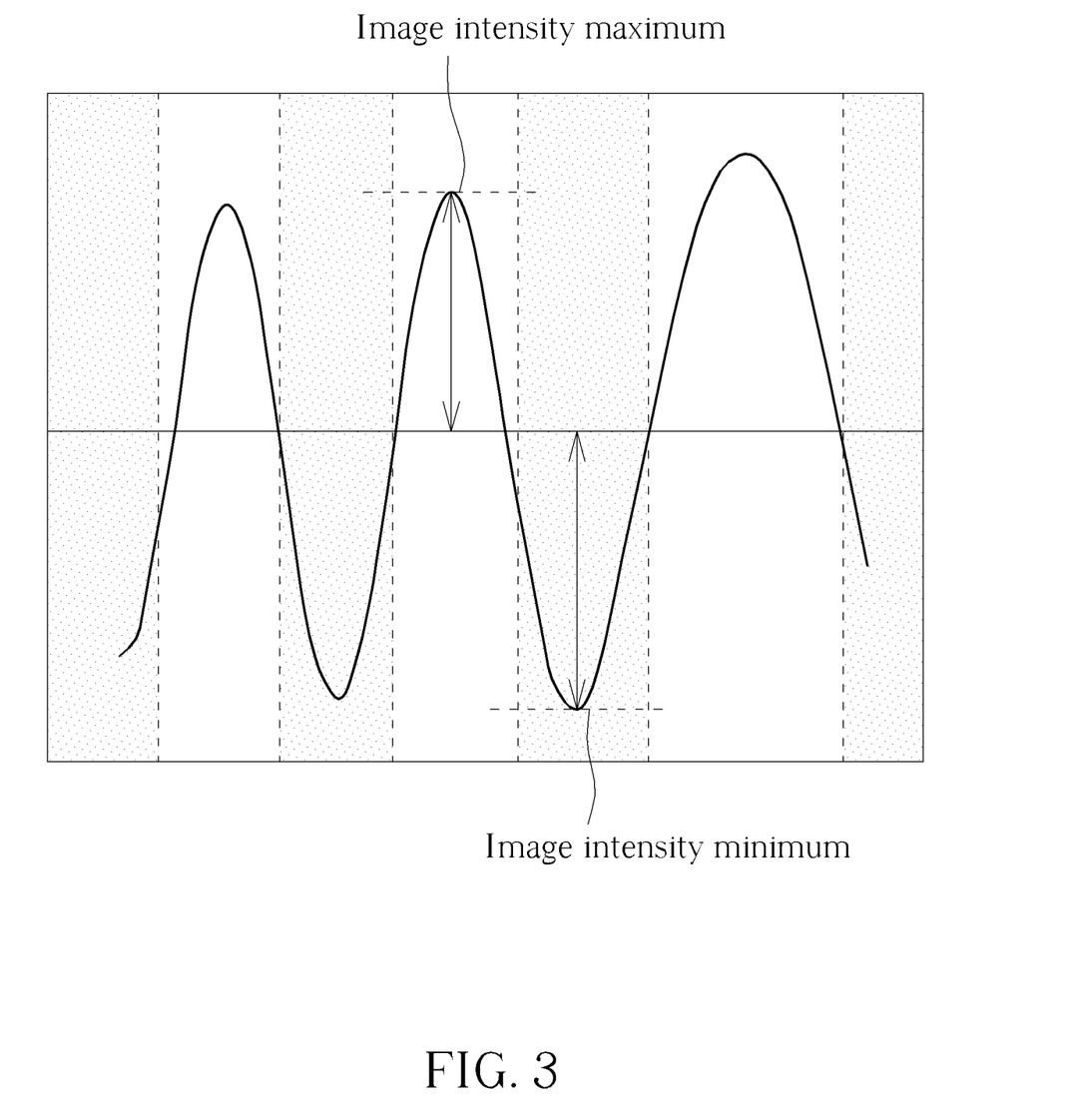
FIG. 3 is a figure of measured image and relevant image intensity of a photomask pattern measured in an image measurement system tool in accordance with the preferred embodiment of the present invention.

After the anchor ratio is defined, in step 201, the photomask pattern for measurement is actually measured to obtain a measured ratio. The example of actual measurement is like FIG. 3, which is a figure of measured image and relevant image intensity of a photomask pattern measured in an image measurement system tool in accordance with the preferred embodiment of the present invention. The CD measurement tool used in the measurement of present invention may be an aerial image measurement system (AIMS), which can acquire images of photomask pattern and conduct measurement through charge-coupled devices (CCDs). As shown in FIG. 3, the dark tone in the figure may be the spaces or blank areas in photomask pattern, while the clear tone in the figure may be trenches in the photomask pattern for forming conductive line patterns. The image intensities of clear tone and dark tone in actual measurement are like the waves shown in the figure. In the clear tone and dark tone of a specific CD, the wave of image intensity has an image intensity maximum and an image intensity minimum, which will be referred hereinafter as an image intensity extremum.

Furthermore, in the embodiment of present invention, with respect to a specific CD in the photomask pattern, a corresponding image anchor threshold is provided to represent an optimal exposure dose for obtaining a target CD in actual exposure stage of the photomask. A measured ratio will be obtained in the present invention based on the aforementioned image intensity maximum, image intensity minimum and the predetermined image anchor threshold. In the embodiment of present invention, with respect to the patterns of clear tone, the measured ratio is equal to the image intensity maximum divided by the image intensity threshold. With respect to the patterns of dark tone, the measured ratio is equal to the image intensity threshold divided by the image intensity minimum. The measured ratio obtained at this stage may be compared with the predetermined anchor ratio to determine if the semiconductor patterns formed through this photomask is at risk of defects.

Figure 4:
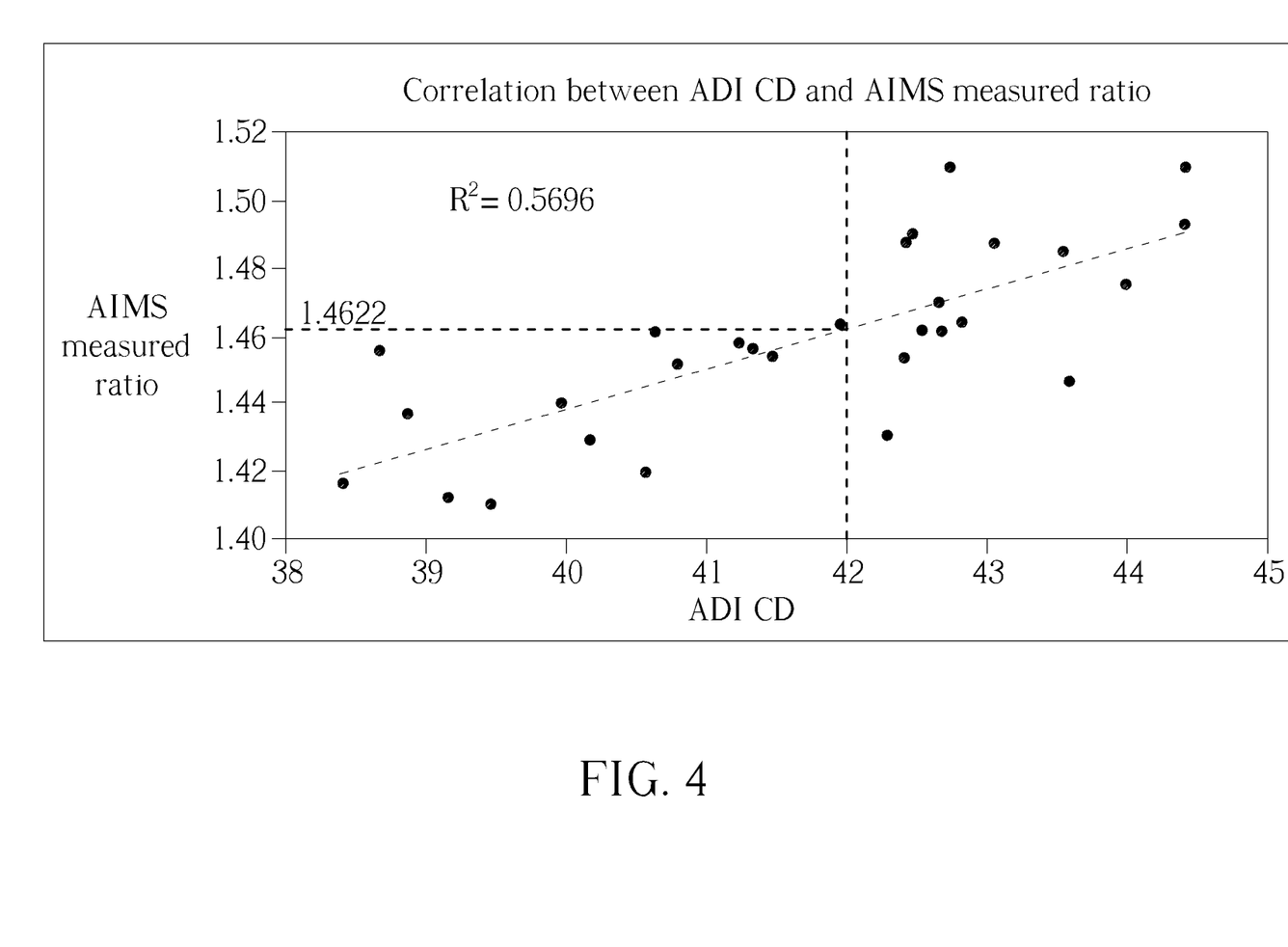
FIG. 4 is a correlation line graph of measured ratio vs. ADI CD of a photomask pattern in accordance with the preferred embodiment of the present invention.

Please refer now to FIG. 4, which is a correlation line graph of measured ratio of a photomask pattern vs. ADI CD in accordance with the preferred embodiment of the present invention. The reason why the quality of a photomask may be inspected through the obtained measured ratio in the present invention is because there is a definite correlation between the measured ratio and the ADI CD resulted from the photomask. As shown in FIG. 4, a linear regression approach is performed to the actual experiment result, and it can be seen that the measured ratio is in a positive linear correlation with the ADI CD, with its coefficient of determination $R^2$ approximately 0.5696. Accordingly, the measure ratio obtained through the measurement in the present invention may be used to infer the ADI CD that will be obtained in later process. For example, when the obtained measured ratio is 1.4622, it may be inferred that an ADI CD of 42 nm will be obtained in later semiconductor processes using the photomask. The correlation obtained on the basis of the aforementioned image intensity in the present invention is far higher than the approach of directly measuring 1D photomask pattern in conventional skills, and it is also suitable for more pattern types, especially for 2D patterns itself or the patterns in surroundings with higher complexity. Thus, this step may be cooperated with conventional approach of measuring 1D pattern to inspect a photomask, in order to obtain a more precise and reliable inspection result.

Refer back to FIG. 2. After the aforementioned measured ratio is obtained, in step 202, the measured ratio will be compared with the predetermined anchor ratio. If the measured ratio is larger than the anchor ratio, the photomask is regarded as passing the inspection and follow-up steps may carry on. If the measured ratio is smaller than the anchor ratio, the photomask is regarded as failing the inspection and steps are reverted to the stage of photomask writing for tuning, for example tuning the exposure dose. Take the example of dark tone (space patterns between metal lines) in FIG. 3, when the measured ratio (the predetermined image intensity threshold divided by the image intensity minimum in the dark tone) is smaller than the anchor ratio, it can be inferred that the resulted ADI CD formed at this place would be smaller than the standard value, so that adjacent circuits may suffer bridging issue. Conversely, take the example of clear tone (trench patterns for forming metal lines) in FIG. 3, when the measured ratio (the image intensity maximum in the clear tone divided by the predetermined image intensity threshold) is smaller than the anchor ratio, it can be inferred that the resulted ADI CD formed at this place would be smaller than the standard value, and the circuit formed at this place may suffer necking issue.

Figure 5:
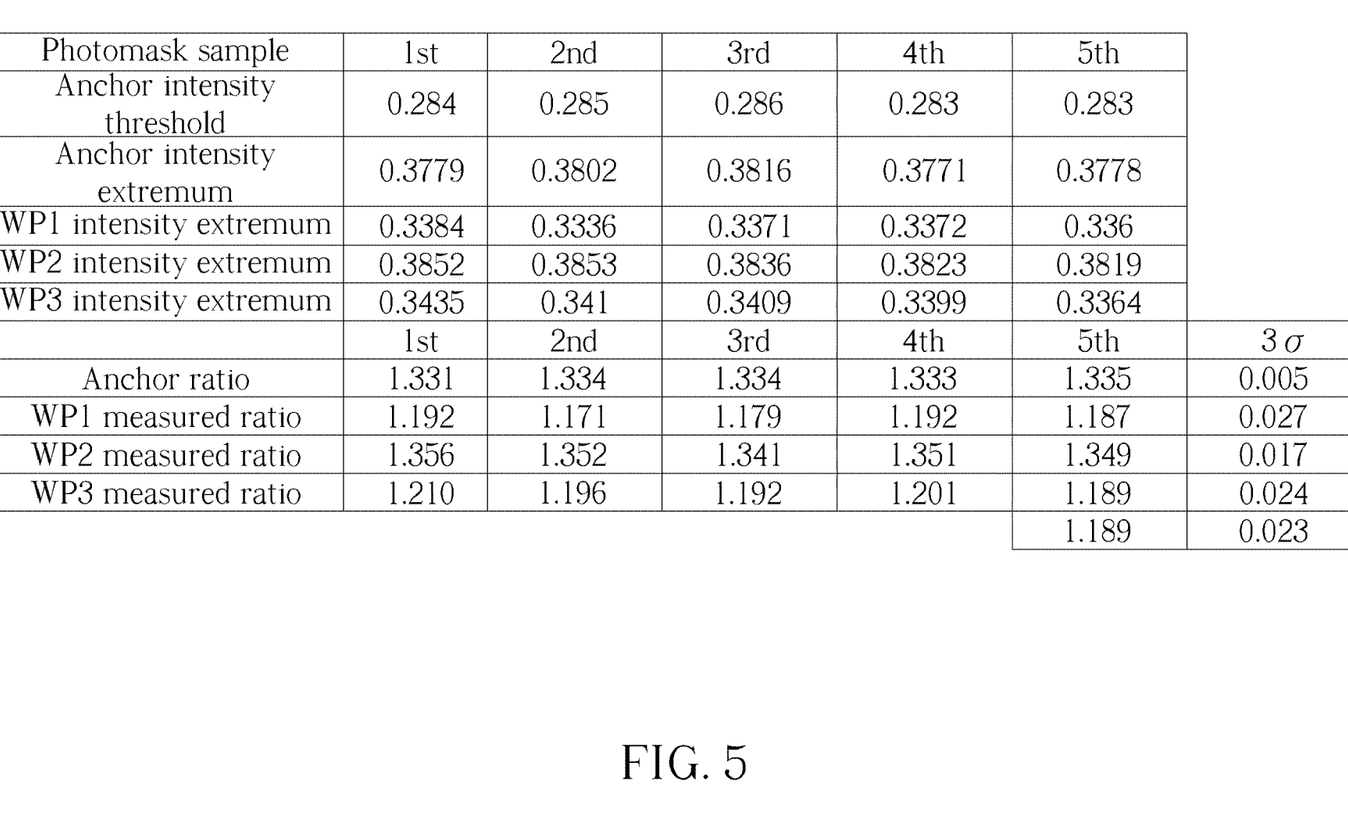
FIG. 5 is a table of anchor intensity threshold, image intensity extremum and resulted measured ratio in a photomask measurement in accordance with the preferred embodiment of the present invention.

Please refer now to FIG. 5, which is a data table of anchor intensity threshold, image intensity extremum and resulted measured ratio in an actual photomask measurement in accordance with the preferred embodiment of the present invention. In the example of photomask sample, three photomask patterns WP1, WP2 and WP3 are measured, and each pattern is measured five times. In the embodiment of present invention, with respect to the photomask sample, the predetermined anchor intensity threshold and anchor intensity extremum may differ depending on the specifications, patterns or CDs of the photomask. The anchor ratio of the photomask sample is the anchor intensity extremum divided by the anchor intensity threshold (for clear tone pattern) or the anchor intensity threshold divided by the anchor intensity extremum (for dark tone pattern). Take the example of data in the figure, the anchor intensity threshold in first measurement is 0.284 and the anchor intensity extremum is 0.3779, then the predetermined anchor ratio for the clear tone pattern is 1.331(=0.3779/0.284). This value will be a standard for the photomask inspection later.

Refer still to FIG. 5. Different image intensity extrema may be obtained in actual measurements with respect to different patterns (or CDs) WP1, WP2, WP3 in the photomask sample. The measured image intensity extremum divided by the aforementioned anchor intensity threshold is the measured ratio obtained from the measurement (for clear tone pattern). Take the example of data in the figure, an image intensity maximum of 0.3384 is obtained from the first measurement for the clear tone pattern WP1, thus it can be known that the measured ratio is 1.192 (=0.3384/0.284). The example of dark tone pattern of the photomask is similar to the example above, wherein the definition of the measured ratio is changed to the anchor intensity threshold divided by the image intensity minimum of the dark tone.

It may also be seen in the table of FIG. 5 that the obtained intensity data may be different even in multiple measurements (1st, 2nd, 3rd . . . ) of the same photomask pattern (ex. WP1). This deviation is resulted from the measurement tolerance of the measurement tool itself, rather than the factor of the measured photomask patterns. Accordingly, a three-sigma ($3\sigma$) value of multiple measurement data is defined and considered as a measurement tolerance for the tool in the embodiment of present invention, and all measured ratios or CDs within this tolerance range are considered passing the inspection. Take the example of data in the figure, the average of three-sigma ($3\sigma$) values of the predetermined anchor ratio data and the measured ratio data of WP1-WP3 is 0.023. This average value may be used to modify the predetermined anchor ratio in the photomask inspection later.

Figure 6:
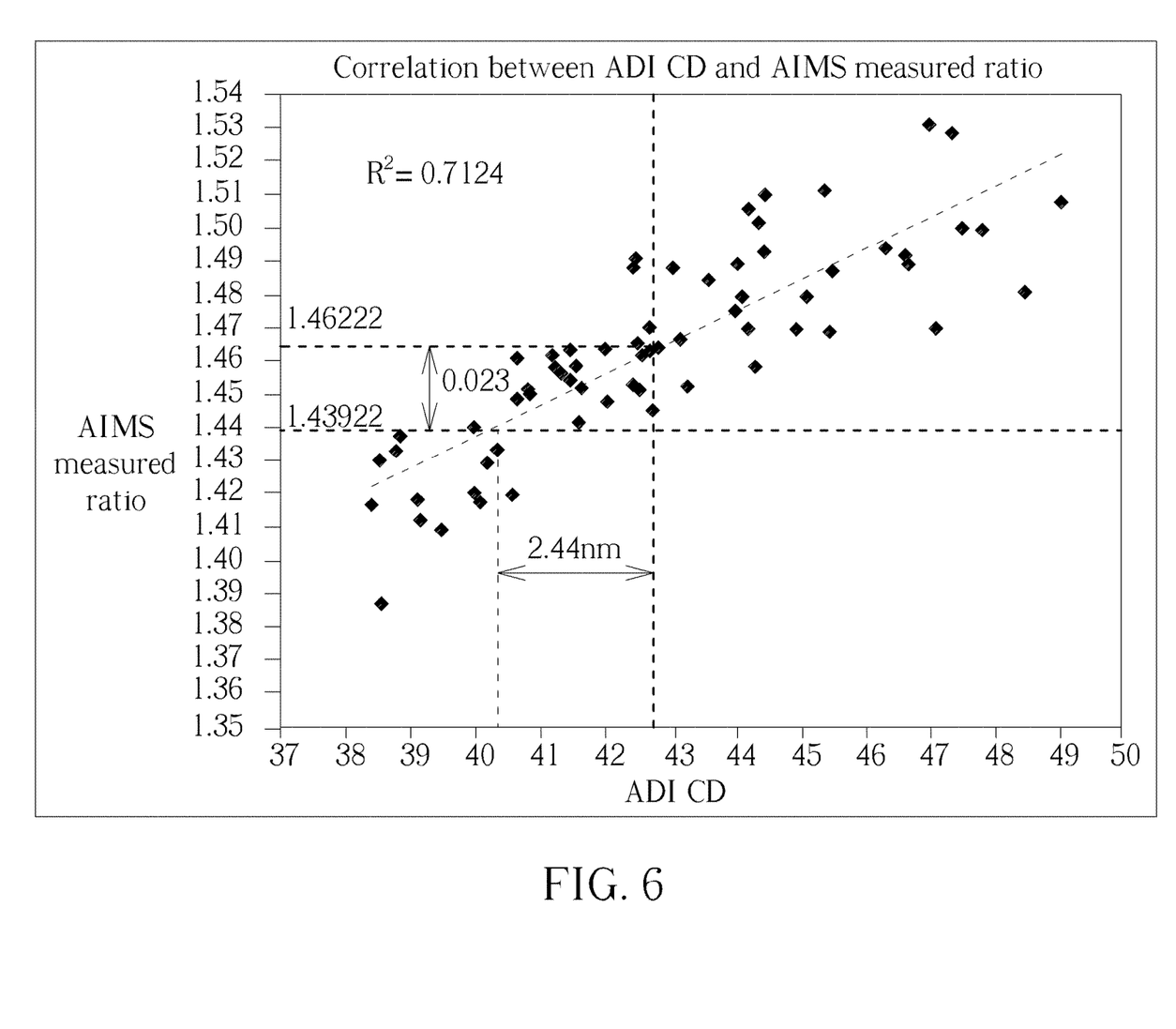
FIG. 6 is a correlation line graph of measured ratio vs. ADI CD of a photomask pattern in accordance with another embodiment of the present invention.

This modification is described in FIG. 6, which is a correlation line graph of measured ratio vs. ADI CD of a photomask pattern in accordance with another embodiment of the present invention. It can be seen in the figure that, with respect to the photomask pattern with a predetermined ADI CD of 43 nm, its corresponding anchor ratio in linear correlation will be 1.4622. However, given that the tool itself has a measurement tolerance (ex. the aforementioned averaged three-sigma value ($3\sigma$)=0.023), the averaged $3\sigma$ value may be used to modify the predetermined anchor ratio to obtain a modified anchor ratio of 1.43922(=1.46222−0.023). The ADI CD corresponding to this modified anchor ratio has a tolerance range of 2.44 nm minus from original 43 nm. With this modification for the measurement tolerance of the measurement tool, it can be seen that the photomask inspection with a result of the measured ratio larger than this modified anchor ratio are all regarded as passing the inspection.

Please refer back to FIG. 1. The step 105 of defect repairing may be performed subsequently after the photomask passes the 2D pattern inspection of step 104 in the present invention. This step is usually to scan the photomask pattern and inspect if there are any defects other than the photomask patterns existing, such as tiny particles or photoresist residues remaining on the photomask. These defects may be removed through normal cleaning process. After defects are repaired, a pellicide, such as a Teflon film, is adhered on the photomask substrate in subsequent step 106 to protect the Cr-based absorption layer having photomask patterns. The photomask adhered with the pellicide will be inspected again (step 107) to make sure there are no defects existing before it leave the factory. If this inspection is passed, the photomask product may leave the factory and to be supplied to semiconductor manufacturers for using in their semiconductor process (step 108).

In summary to the aforementioned embodiments, the present invention provides a photomask inspection method, with features of adopting image intensity ratio having higher correlation with ADI CD as a basis for the inspection and the inferred ADI CD through the method would be more conform to the result of actual pattern, which is an invention more suitable to inspect the quality and reliability of photomasks and provided both with novelty and non-obviousness.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A photomask inspection method for reliable ADI CD, comprising:
   providing a photomask, wherein the photomask comprises patterns formed by implementing design tools through computer equipment and written on a substrate of said photomask through photolithography process, and said photomask is used to pattern a photoresist in a photolithography process;

acquiring an image of said patterns of said photomask through image sensor in an image measurement system tool, wherein said patterns in said image are presented through said image measurement system tool by using a contrast of dark tones and clear tones of said image, and image intensities of said dark tones and clear tones are presented by said image measurement system tool in a formed of a wave having an image intensity extremum;

defining an anchor intensity threshold, wherein said anchor intensity threshold represents an optimal exposure dose for obtaining said patterns having a target critical dimension in an exposure stage of said photolithography process when using said photomask to pattern said photoresist, and said wave of said image intensities of said patterns with said target critical dimension has an anchor intensity extremum;

defining an anchor ratio, wherein said anchor ratio is equal to a value of said anchor intensity extremum divided by said anchor intensity threshold or is equal to a value of said anchor intensity threshold divided by said anchor intensity extremum;

measuring a critical dimension of said patterns of said photomask in an actual measurement by said image measurement system tool to obtain a measured ratio, wherein said measured ratio is equal to a value of said image intensity extremum obtained in said actual measurement divided by said anchor intensity threshold or is equal to a value of said anchor intensity threshold divided by said image intensity extremum obtained in said actual measurement;

if said measured ratio is larger than said anchor ratio, said photomask is determined as passing an inspection for reliable ADI CD of said photoresist patterned through said photomask, and if said measured ratio is smaller than said anchor ratio, said photomask is determined as failing said inspection;

using said photomask that is determined as passing said inspection for reliable ADI CD to pattern a photoresist in a photolithography process; and reverting said photomask that is determined as failing said inspection for reliable ADI CD to photomask writing stage for tuning said patterns.

2. The photomask inspection method for reliable ADI CD of claim 1, wherein said image intensity extremum is an image intensity extremum resulted from measuring said image intensity of said clear tone or an image intensity extremum resulted from measuring said image intensity of said dark tone in said image measurement system tool, and if said image intensity extremum is said image intensity extremum of said clear tone, said measured ratio is equal to said image intensity extremum divided by said anchor intensity threshold, and if said image intensity extremum is said image intensity extremum of said dark tone, said measured ratio is equal to said anchor intensity threshold divided by said image intensity extremum.

3. The photomask inspection method for reliable ADI CD of claim 1, wherein said anchor ratio of said photomask is in a positive linear correlation with said critical dimension.

4. The photomask inspection method for reliable ADI CD of claim 3, wherein said anchor ratio has a measurement tolerance, and said anchor ratio minus said measurement tolerance equals to a modified anchor ratio, and if said measured ratio is larger than said modified anchor ratio, said photomask is regarded as passing the inspection, and if said measured ratio is smaller than said modified anchor ratio, said photomask is regarded as failing the inspection.

5. The photomask inspection method for reliable ADI CD of claim 1, wherein image measurement system tool is an aerial image measurement system (AIMS).

* * * * *